United States Patent [19]

Lucas et al.

[11] Patent Number: 4,749,666

[45] Date of Patent: Jun. 7, 1988

[54] INDIUM-BASED FLUORIDE GLASSES AND THEIR PREPARATION

[75] Inventors: Jacques Lucas, Betton; Gilles H. Fonteneau, Chateaugiron; Abdelmajid Bouaggad, Rennes, all of France

[73] Assignee: Centre National de la Recherche Scientifique (CNRS), Paris, France

[21] Appl. No.: 944,154

[22] Filed: Dec. 22, 1986

[30] Foreign Application Priority Data

Dec. 27, 1985 [FR] France ............... 85 19309

[51] Int. Cl.$^4$ .................................... C03C 3/32
[52] U.S. Cl. .......................... 501/40; 501/904
[58] Field of Search .................. 501/40, 904

[56] References Cited

U.S. PATENT DOCUMENTS 4,141,741 2/1979 Lucas et al. ............... 501/40
4,666,870 5/1987 Poulain et al. ............ 501/40

OTHER PUBLICATIONS

Chemical Abstracts, vol. 102, No. 26, Jul. 1985, p. 260, No. 224806e, Auriault et al.
Chemical Abstracts, vol. 99, No. 10, 1983, p. 283, No. 75524b-Drexhage et al.
Glass Technology, vol. 24, No. 3, Jun. 1983, pp. 164-167, Jacoboni et al.

Primary Examiner—William R. Dixon, Jr.
Assistant Examiner—David M. Brunsman
Attorney, Agent, or Firm—Cushman, Darby & Cushman

[57] ABSTRACT

Fluoride glasses comprise at least one fluoride of each of the following five categories:

| Fluorides | Molar amount % |
|---|---|
| $M^1F_3$ | u |
| $M^2F_4$ | v |
| $M^3F_2$ | w |
| $M^4F_3$ | x |
| $M^5F_2$ | y | wherein $M^1$ represents In or Ga; $M^2$ represents Th or U; $M^3$ represents Ba or Pb; $M^4$ represents Y, Yb or Lu; $M^5$ represents Zn or Mn; and wherein u=25-35; v=5-12; w=25-35; x=5-12; and y=15-30; and optionally, at least one adjuvant or dopant present in a molar percent, z, wherein z=0-4. This composition is capable of providing, by casting in the molten state, followed by cooling, pieces of glass having a thickness greater than 10 mm. The specification also describes a method of producing these fluoride glasses.

6 Claims, No Drawings

INDIUM-BASED FLUORIDE GLASSES AND THEIR PREPARATION

The present invention relates to new fluoride glasses based on indium as well as to a process for their preparation.

It is known that the development of infra-red uses has spurred research to develop new materials which are transparent at infra-red wave lengths and in particular for materials in the form of a glass which can be easily formed and prepared relative to crystalline derivatives.

Various classes of metallic fluoride-based glasses which are generally designated as "fluoride glasses" have been described in the literature.

While great interest in fluoride glasses for use in the transmission of infra-red is well known, until now, these glasses have not found widespread industrial use because of the difficulty in preparing large and homogeneous vitreous pieces. The only exception are glasses based on zirconium fluoride which have been described in French patent application Nos. 76.18878 and 77.09618.

The potential interest in indium-based fluoride glasses has been mentioned by J. J. Videau and Coll., C. R. Acad. Sc. Paris, vol. 297, pages 483–485 (1983). However, the compositions mentioned by these authors not appear capable of being employed industrially because attempts to reproduce them, under the conditions described, for example, with the composition (32% $BaF_2$, 17% $YF_30$, 11% $PbF_2$ and 40% $InF_3$), have not yielded homogeneous, vitreous samples.

In French patent application No. 80.06088 (publication No. 2.478.618), various theoretical considerations on compositions capable of yielding fluoride glasses have been set forth. These considerations appear, however, questionable or incomplete, since certain compositions mentioned in this French patent application, in particular the composition containing indium, do not provide glasses, even after energetic tempering. Rather, mixtures of glass and ceramic are formed.

In view of this it was considered desirable to look for new compositions, based on indium fluoride, that would provide, under acceptable conditions, large pieces of glass or optical fibers made therefrom.

The present invention this relates to new compositions of indium-based fluoride glasses which possess two desired technical qualities for a fluoride glass:

(a) a relatively slow crystallization rate whereby pieces having a significant thickness can be produced and whereby preforms can be made into optical fibers; and (b) a wide field of transmission in the infra-red, which is greater than that of glasses based on zirconium: 0.3–6.5 micrometers for zirconium-based glasses based compared to 0.2–8 micrometers for glasses of the present invention.

The present invention thus relates to fluoride glasses comprising a composition containing at least one fluoride of each of the following five categories:

| Fluorides | Molar Proportions (%) |
| --- | --- |
| $M^1F_3$ | u |
| $M^2F_4$ | v |
| $M^3F_2$ | w |
| $M^4F_3$ | x |
| $M^5F_2$ | y |

$M^1$ representing In or Ga,
$M^2$ representing Th or U,
$M^3$ representing Ba or Pb,
$M^4$ representing Y, Yb or Lu, and
$M^5$ representing Zn or Mn, wherein u=25–35, v=5–12, w=25–35, x=5–12 and y=15–30, and optionally, at least one adjuvant or dopant at a molar percentage, z, wherein z=0–4, it being understood that the sum, (u+v+w+x+y+z) is equal to 100, the said composition being capable of giving, on casting from the molten state followed by cooling, pieces of glass having a thickness greater than 10 mm (having for example a thickness of 10–25 mm).

The function of the adjuvants or dopants is both to assist the stabilization of the glasses by increasing ion disorder, and optionally to vary within certain limits the properties of the base glass.

The adjuvants or dopants can be essentially any fluoride other than the metallic fluorides mentioned above. In particular, alkali metal fluorides (Li, Na, K, Rb and Cs), metal fluorides $M^{II}F_2$ wherein $M^{II}$=Ca, Sr, Ni, Co, V, Fe, Cr, Cu, etc. . . . or $M^{III}F_3$ fluorides wherein $M^{III}$=Fe, Cr, Co, Ti, V, Bi, etc. can be employed.

Representative glasses of the present invention include, in particular, glasses conforming to the above definition, characterized by the fact that they contain positive amounts of the fluorides of indium, thorium and barium, in molar percentages m, p and q, respectively, and that they contain, optionally, fluorides of gallium, uranium and/or lead in molar percentages, r, s and t, respectively, which can be zero, and such that the ratio r/(m+r) is lower than or equal to 0.2;
s/(p+s) is lower than or equal to 0.2; and
t/(q+t) is lower than or equal to 0.5;

wherein m+r=25–35; p+s=5–12; and q+t=25–35, it being understood that for these glasses the sum (m+p+q+r+s+t+x+y+z) is equal to 100.

In one preferred embodiment of the present invention, the fluoride glasses comprise:

| Constituents | Molar Proportions (%) |
| --- | --- |
| $InF_3$ | 25–35 |
| $ThF_4$ | 5–12 |
| $BaF_2$ | 25–35 |
| $M^4F_3$ | 5–12 |
| $M^5F_2$ | 15–30 |
| Adjuvant | 0–4 | wherein
$M^4$ and $M^5$ are defined above, it being understood that the sum of the molar proportions of the constituents is equal to 100.

The present invention concerns principally the particular glasses described below in the experimental portion of this specification.

The present invention also relates to a process for preparing the glasses defined above.

This process principally comprises admixing the fluoride constituents, or the corresponding oxides together with the necessary amount of a fluorinating agent so as to transform the oxides into fluorides; melting the fluoride mixture under a neutral and dry atmosphere; and then cooling the resulting liquid composition in accordance with conventional procedures to provide the glass in the desired form.

The fluoride mixture is generally melted and homogenized at a temperature in the neighborhood of 700°–780° C. The temperature is then reduced to, for example, about 660°–680° C., the temperature at which the glass is then cast.

In accordance with a particular embodiment of the present invention the melted glass is cast in, for example, a brass mold.

The brass mold is preferably previously heated to a temperature lower than the crystallization temperature of the resulting glass and in particular at a temperature lower than, for example, about 140° C. at this crystallization temperature.

The liquid composition can also be cast in a cylindrical mold to give a preform which can then be drawn into fibers in accordance with conventional methods.

Further the resulting preform can be concentrically introduced into a cylindrical mold having a diameter greater than the diameter of the preform. Thereafter, another glass having a composition of the present invention can be cast in the mold around the cylindrical glass preform, the said another glass having a different and lower index, than the index of the interiorly positioned glass preform.

After solidification, the resulting preform composite can be unmolded and annealed, for example, at a temperature of about 300° C. This preform composite can then be drawn into fibers in accordance with conventional procedures.

By casting on a brass disk, it is possible to obtain, with the composition of the present invention, homogeneous vitreous compositions being several tens of centimeters in diameter and having a thickness of 10 to 20 mm.

The metallic fluorides used as an initial reactant are indeed commercial products. Other fluorides can be obtained in accordance with known methods, principally starting with corresponding oxides and using appropriate fluorinating agents, for example, ammonium difluoride, $NH_5F_2$.

The invention also relates to molded or shaped pieces or optical fibers, produced with a glass such as defined above.

The following non-limiting examples illustrate the present invention.

EXAMPLE 1

The following halides are admixed in the amounts indicated below:

| Constituents | Molar Percent |
| --- | --- |
| $BaF_2$ | 30 |
| $ThF_4$ | 10 |
| $YbF_3$ | 10 |
| $ZnF_2$ | 20 |
| $InF_3$ | 30 |

The mixture is heated to a temperature of 700° C. in a neutral and dry atmosphere.

The resulting liquid composition is poured into a flat cylindrical brass mold which has been preheated to a temperature of about 300° C.

A large homogeneous vitreous composition having a thickness of 15 mm is thereby obtained.

The characteristics of the resulting glass are as follows:

Tg=324° C.
Tc=447° C.
Tf=610° C.
n=1.51

EXAMPLES 2 TO 10

In a similar manner, fluoride glasses having the following compositions (mole percent) and characteristics have been prepared.

| Example | $BaF_2$ | $ThF_4$ | $YbF_3$ | $ZnF_2$ | $InF_3$ | Tg, °C. | Tc, °C. | Tf, °C. |
| --- | --- | --- | --- | --- | --- | --- | --- | --- |
| 2 | 30 | 10 | 10 | 25 | 25 | 324 | 428 | >600 |
| 3 | 30 | 05 | 05 | 30 | 30 | 308 | 382 | 638 |
| 4 | 30 | 10 | 05 | 25 | 30 | 318 | 437 | >620 |
| 5 | 30 | 10 | 05 | 30 | 25 | 315 | 418 | >620 |
| 6 | 30 | 10 | 10 | 15 | 35 | 328 | 439 | ~600 |
| 7 | 28 | 10 | 10 | 22 | 30 | 325 | 442 | ~600 |
| 8 | 28 | 10 | 12 | 20 | 30 | 326 | 447 | ~600 |
| 9 | 28 | 10 | 10 | 23 | 29 | 321 | 440 | ~600 |
| 10 | 27 | 11 | 09 | 20 | 33 | 324 | 435 | ~605 |

EXAMPLE 11

In a similar manner, a glass having the following composition (mole percent): 30 $BaF_2$, 10 $ThF_4$, 10 $YbF_3$, 20 $MnF_2$, 30 $InF_3$, has been prepared.

The resulting glass has the following characteristics: Tg=325° C.; Tc=405° C. and Tf=610° C.

EXAMPLE 12

In a similar manner, a glass having the following composition (mole percent): 23 $BaF_2$, 7 $PbF_2$, 10 $ThF_4$, 10 $YbF_3$, 20 $ZnF_2$ and 30 $InF_3$, and having the following characteristics: Tg=306° C. and Tc=436° C. has been prepared.

EXAMPLE 13

In a similar manner, a glass having the following composition (mole percent): 27 $BaF_2$, 3 $PbF_2$, 10 $ThF_4$, 10 $YbF_3$, 20 $ZnF_2$ and 30 $InF_3$, and having the following characteristics: Tg=316° C. and Tc=416° C. has been prepared.

EXAMPLE 14

In a similar manner, glasses having the compositions indicated in the following Table have been prepared.

In this Table, essentially only the metallic fluoride components have been indicated.

The amounts given are expressed in mole percent.

| Ex | Ba | In | Th | Y | Yb | Lu | Zn | Mn | Pb | Ga | U | Adjuvant |
| --- | --- | --- | --- | --- | --- | --- | --- | --- | --- | --- | --- | --- |
| 14 | 26.5 | 30 | 10 | 12 | | | 18 | | 3.5 | | | |
| 15 | 30 | 30 | 8 | | 10 | | 20 | | | | 2 | |
| 16 | 30 | 35 | 28 | | 10 | | 15 | | | | 2 | |
| 17 | 30 | 25.5 | 10 | | | 10 | 20 | | 4.5 | | | |
| 18 | 30 | 28 | 10 | | | 10 | 20 | | | | 2 | |

-continued

| Ex | Ba | In | Th | Y | Yb | Lu | Zn | Mn | Pb | Ga | U | Adjuvant |
|---|---|---|---|---|---|---|---|---|---|---|---|---|
| 19 | 30 | 30 | 10 |   | 10 |   | 10 |   |   |   |   |   |
| 20 | 30 | 30 | 10 |   | 10 |   | 20 |   |   |   |   |   |
| 21 | 24 | 33 | 11 |   | 9  |   | 20 |   | 3 |   |   |   |
| 22 | 30 | 25 | 8.5| 5 |    |   | 30 |   |   |   | 1.5 |   |
| 23 | 30 | 25 | 8.5| 5 |    |   | 20 | 10|   |   | 1.5 |   |
| 24 | 30 | 30 | 10 | 5 | 5  |   | 20 |   |   |   |   |   |
| 25 | 30 | 30 | 10 |   | 5  | 5 | 20 |   |   |   |   |   |
| 26 | 26 | 30 | 10 |   | 10 |   | 20 |   | 4 |   |   |   |
| 27 | 27 | 25 | 10 | 10|    |   |    | 20| 3 | 5 |   |   |
| 28 | 30 | 30 | 10 |   | 5  |   | 25 |   |   |   |   |   |
| 29 | 30 | 30 | 12 | 10|    |   | 18 |   |   |   |   |   |
| 30 | 20 | 33 | 11 |   | 9  |   | 15 | 5 | 3 |   |   | Na 4 |
| 31 | 20 | 33 | 11 |   | 9  |   | 5  | 15| 3 |   |   | Na 4 |
| 32 | 26 | 30 | 8  |   |    | 10| 22 |   |   |   |   | Ca 4 |
| 33 | 18 | 30 | 10 |   | 10 |   | 20 |   | 12|   |   |   |

EXAMPLE 34

Example of the preparation of a preform for optical fibers

Into a cylindrical mold, 20 cm long and having a diameter of 15 mm, there is poured the glass composition of Example 24 melted at 700° C.

After solidification by cooling, the resulting glass, in the form of a cylindrical bar, is annealed at 300° C.

The resulting glass tube is then preheated in a neutral atmosphere and introduced, in a concentric manner, into a brass cylindrical mold having a height of 20 cm and a diameter of 20 mm.

The assembly is then preheated to 330° C. at which point the glass of Example 1, in a melted state, is poured into the mold around the glass cylinder.

After solidification, the enveloped inner glass cylinder is unmolded and annealed at 300° C.

This preform can then be made into fibers in accordance with known procedures.

What is claimed is:

1. A fluoride glass composition comprises at least one fluoride of each of the following five categories:

| Fluoride | Molar amount, percent |
|---|---|
| $M^1F_3$ | u |
| $M^2F_4$ | v |
| $M^3F_2$ | w |
| $M^4F_3$ | x |
| $M^5F_2$ | y | wherein
 $M^1$ representing In or Ga,
 $M^2$ representing Th or U,
 $M^3$ representing Ba or Pb,
 $M^4$ representing Y, Yb or Lu, and
 $M^5$ representing Zn or Mn,
and wherein u=25-35, v=5-12, w=25-35, x=5-12 and y=15-30, and optionally, at least one adjuvant or dopant present in a molar percent, z, wherein z=0-4, and wherein the sum, (u+v+w+x+y+z) is equal to 100.

2. The fluoride glass of claim 1 which contains a positive amount of the fluorides of indium, thorium and barium, in molar percentages, respectively, of m, p and q, and optionally containing fluorides of gallium, uranium and/or lead present in molar percentages, respectively, of r, s and t which can be zero and such that the ratio r/(m+r) is lower than or equal to 0.2;
 s/(p+s) is lower than or equal to 0.2; and
 t/(q+t) is lower than or equal to 0.5;
wherein m+r=25-35; p+s=5-12; and q+t=25-35, and wherein the sum, (m+p+q+r+s+t+x+y+z) is equal to 100.

3. The fluoride glass of claim 1 comprising:

| Constituent | Molar Proportion |
|---|---|
| $InF_3$ | 25-35 |
| $ThF_4$ | 5-12 |
| $BaF_2$ | 25-35 |
| $M^4F_3$ | 5-12 |
| $M^5F_2$ | 15-30 |
| Adjuvant | 0-4 | and wherein
 the sum of the molar proportions of the constituents is equal to 100.

4. A process for preparing a fluoride glass of claim 1 comprising admixing the fluoride constituents, or corresponding oxides thereof together with a sufficient amount of a fluorinating agent to convert said oxides to fluorides, melting said mixture under a neutral and dry atmosphere, and cooling the resulting liquid composition so as to produce the said fluoride glass in the desired form.

5. The fluoride glass of claim 1 in molded or shaped form.

6. The fluoride glass of claim 1 in the form of optical fibers.

* * * * *